INVENTORS
SID W. SHELTON,
RICHARD L. CROSSMAN
BY
ATTORNEYS

INVENTORS.
SID W. SHELTON,
RICHARD L. CROSSMAN
BY
ATTORNEYS

3,179,360
INFLATABLE PERSONNEL RESTRAINT SYSTEM FOR ADVANCED FLIGHT VEHICLES

Sid W. Shelton, Costa Mesa, Calif., and Richard L. Crossman, Tallmadge, Ohio, assignors to the United States of America as represented by the Secretary of the Air Force
Filed Apr. 30, 1963, Ser. No. 277,060
9 Claims. (Cl. 244—122)

This invention relates to personnel restraint systems for the protection and comfort of astronauts or pilots of high flying ultra speed airplanes. It is especially useful in protecting personnel from sudden acceleration, deceleration and vibration encountered in advanced flight vehicles.

Briefly, the system comprises an integrated restraint and supplementary body support system which is pneumatically operated both by manual and automatic controls and is capable of continuous and repetitive operation as required. Two Airmat pads, filled with polyether foam, serve as the supplementary body support system, and in the deflated condition the seating characteristics are maintained by the polyether foam. When pressurized, the rigidizing characteristics of the material are utilized.

In addition to the supplementary body support system just described, the system comprises a torso vest with a torso retraction reel, a head net with two inflatable ear pads for head restraint, arm nets and retraction means with actuating bladders for arm and wrist restraint, leg curtains with retraction cables and a retraction reel, an actuating bladder for leg restraint and a pressurization and control system.

It has been determined by experiment that the factors which influence a personnel restraint system for advanced flight vehicles dictate that it must be designed so that it will not fail when subjected to the following conditions: 60 $g$'s transverse to the long axis of the body applied at a rate of onset of 1500 $g$'s per second (forward facing deceleration): 30 $g$'s positive at a rate of onset of 300 $g$'s and 20 $g$'s negative at 300 $g$'s per second rate of onset (1 $g$=215 pounds).

It has also been determined that for vertically launched orbital vehicles, a personnel restraint system must provide, in addition to the requirements of present restraint systems, the following:

(1) Comfort and protection in the weightless state,
(2) Vibration protection,
(3) Variable restraint controlled by the pilot for normal flight conditions,
(4) Variable restraint automatically controlled for crash, emergency escape, and ground impact decelerations, and
(5) Automatic restraint to provide a means for recovering an incapacitated pilot.

It has been indicated by experiment that there is no assurance that the man within a space capsule will not be exposed to violent ground impact decelerations from any direction due to the inadequacy of present energy absorption devices. Further, there is no assurance that he will not be exposed to post-impact accelerations from any direction due to tumbling of the capsule. An energy absorption device is needed which will operate efficiently when a horizontal velocity component is combined with the vertical velocity of the capsule at ground impact. Until these accelerations and decelerations can be controlled by energy absorption devices and a non-tumbling capsule is provided, there is but one choice between comfort and survival; the man must be provided with a maximum of protection against ground impact decelerations with a restraint device and be permitted as much comfort, mobility, and operational dexterity during flight as is possible. In this connection, it has been established that the acceleration values set forth above are beyond any published limits of human tolerance to acceleration or deceleration.

It is a purpose of this invention, therefore, to provide a system which meets all of the aforementioned requirements and protects astronauts and pilots of ultra speed airplanes against the severe accelerations, decelerations and vibrations encountered in such flights.

It is a further object of this invention to provide a system of restraint having components which may be manually controlled to suit normal flight by a pilot or astronaut, and further to provide an automatic protective system in case of emergencies.

It is also an object of this invention to provide a restraint system for a pilot or astronaut which will have the maximum of comfort and freedom of movement commensurate with protection.

It is a still further object of this invention to provide a restraint system of conventional, currently available materials that lend themselves to standard mass production manufacturing techniques.

The above and still other objects, advantages and features of this invention will become apparent upon consideration of the following detailed description of one embodiment thereof, especially when taken in conjunction with the accompanying drawings, in which.

Figure 1:
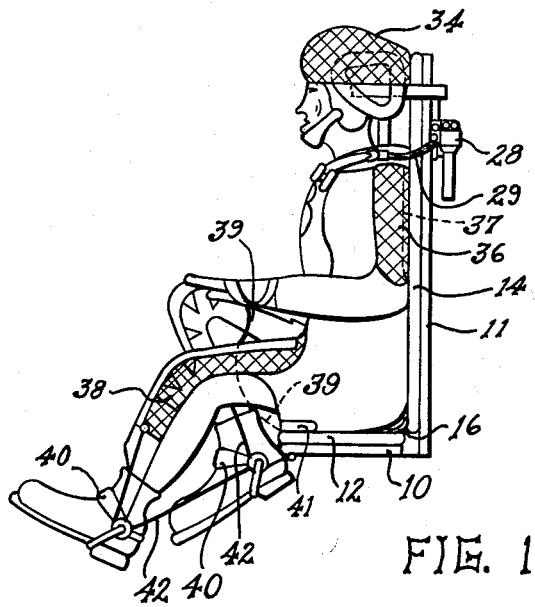
FIGURE 1 is a diagrammatic representation illustrating the principal components of the system applied to a seated astronaut.
Figure 2:
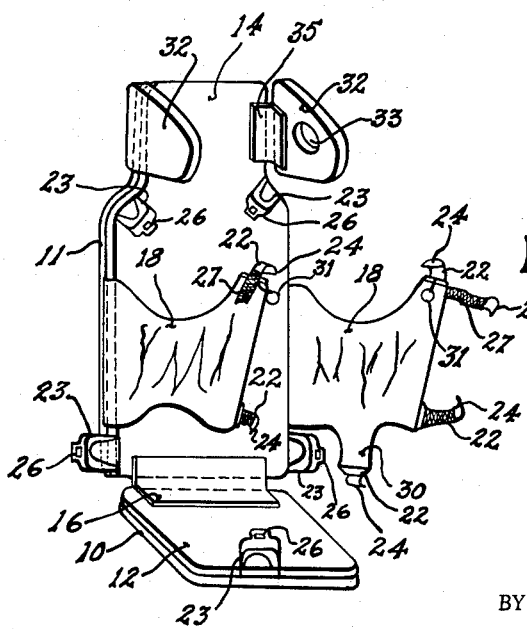
FIGURE 2 shows the seat with a back rest, a torso vest, back and seat pads, and ear pads which comprise the supplementary body support system.

The personnel restraint system is illustrated in FIGURE 1 with a pilot or astronaut shown in a seated position. The basic support system comprises an adjustable rigid seat 10 and an adjustable seat back 11 attached to the aircraft or space vehicle; the adjustment being made in a conventional manner by means of the attachment (not shown) of the seat elements to the craft or capsule. Placed on the seat and against the back and forming part of the supplementary body support system, are two Airmat pads 12 and 14 (more clearly shown in FIGURE 2), which are joined together by means of joining fabric 16. The two Airmat pads may be loosely attached to the seat 10 and the back rest 11 by fabric at the edges of the pads secured, for example, by gluing to the seat elements. As previously stated, the pads are filled with polyether foam, such that when the pads are deflated, the seating characteristics are maintained by the foam; but when the pads are pressurized, as hereinafter shown, the rigidizing characteristic of the Airmat material is utilized for supporting the body of the astronaut.

The remaining basic components of the supplementary body support system comprise a torso vest (FIGURE 2) which is formed of two pieces of fabric 18 arranged to overlap the occupant's chest with each half of the vest having one edge thereof bonded to a side of the back pad 14. This overlapping arrangement allows for a wide load distribution capability. The vest is made of neoprene coated Dacron in order that the neoprene will provide stability for the Dacron material and protection against environmental conditions. A fabric backing may be provided to allow for ventilation between the occupant and the neoprene coated fabric.

Variations in size of the pilot may be accommodated by the torso vest by utilizing lacings or conventionally adjustable straps 22 at various portions of the vest. Each strap 22 has one-half of a standard quick disconnect fastener 24 applied thereto for engagement with mating portions 26 which are applied to the back pad 14 and seat pad 12 by means of cables or webbed straps 23. The two uppermost straps 22 of the torso vest are secured to elements 26 on the opposite side of the back pad 14; the criss-cross formation being followed with the two symmetrically located straps 22 adjacent the bottom portion of the vest. An extension 30 at the lowermost portion of the vest has its strap and quick disconnect fastener 24 secured to mating portion 26 on the seat pad 12 in order to prevent the torso from sliding forward or "submarining" on impact or sudden deceleration.

The torso vest is connected to a torso retraction reel which effectively retracts the shoulders of the astronaut and the back pad. A retraction reel 28 is secured to the back of the seat portion 11 and winds up cords or straps 29 which are secured to rings 31 on the torso vest. The retraction reel includes a conventional pneumatic motor which is initiated by means which will be hereinafter explained.

Another component of the body supplementary support system comprises a pair of inflatable ear pads 32 having hollowed out portions at 33 for accommodation of ear phones secured to the astronaut's helmet. The ear pads 32 are composed of the same material as the seat and back pads except without the polyether foam inside and are rendered inflatable. Attachment of the ear pads 32 to the back pad 14 may be made by means of strips of material 35 in engagement with both parts (see FIGURE 2). A head net 34 (FIGURE 1) encompasses the astronaut's helmet and ear pads and is secured to both the ear pads and the back pad. For variations in size, lacing may be provided in the netting.

As shown in FIGURE 1, arm restraint is achieved by the utilization of a net 36 which extends from the quick release fastener located at the lap portion 30 of the torso vest and extends across the front of the torso to the arm and shoulder and around an inflatable bladder 37 adjacent the arm to the back pad where the net is anchored. The nylon net 36 and its associated inflatable bladder 37 behind the upper arm have no effect on the wrists of the astronaut.

Restraint of the wrists is achieved by means of cables 39 secured by quick clips to gloves on the astronaut's hands and is actuated by the foot restraint system.

A stirrup 40 is attached to the astronaut's shoe and has cabling 42 from the bottom of the seat 10 around a roller of the stirrup 40 and secured to the shin portion of a leg curtain 38. The opposite end of the leg curtain is secured to the bottom of the vest. A bladder 41 is provided between the seat pad and thigh of an astronaut such that pressurization of the bladder lifts the thigh and causes the cabling 42 to draw the astronaut's feet inwardly toward the seat. At the same time, cabling 39 from the astronaut's wrists is shortened by means of their attachment beneath the bladder, and upon inflation the wrist portions are drawn down toward a position on the astronaut's thigh.

Figure 3:
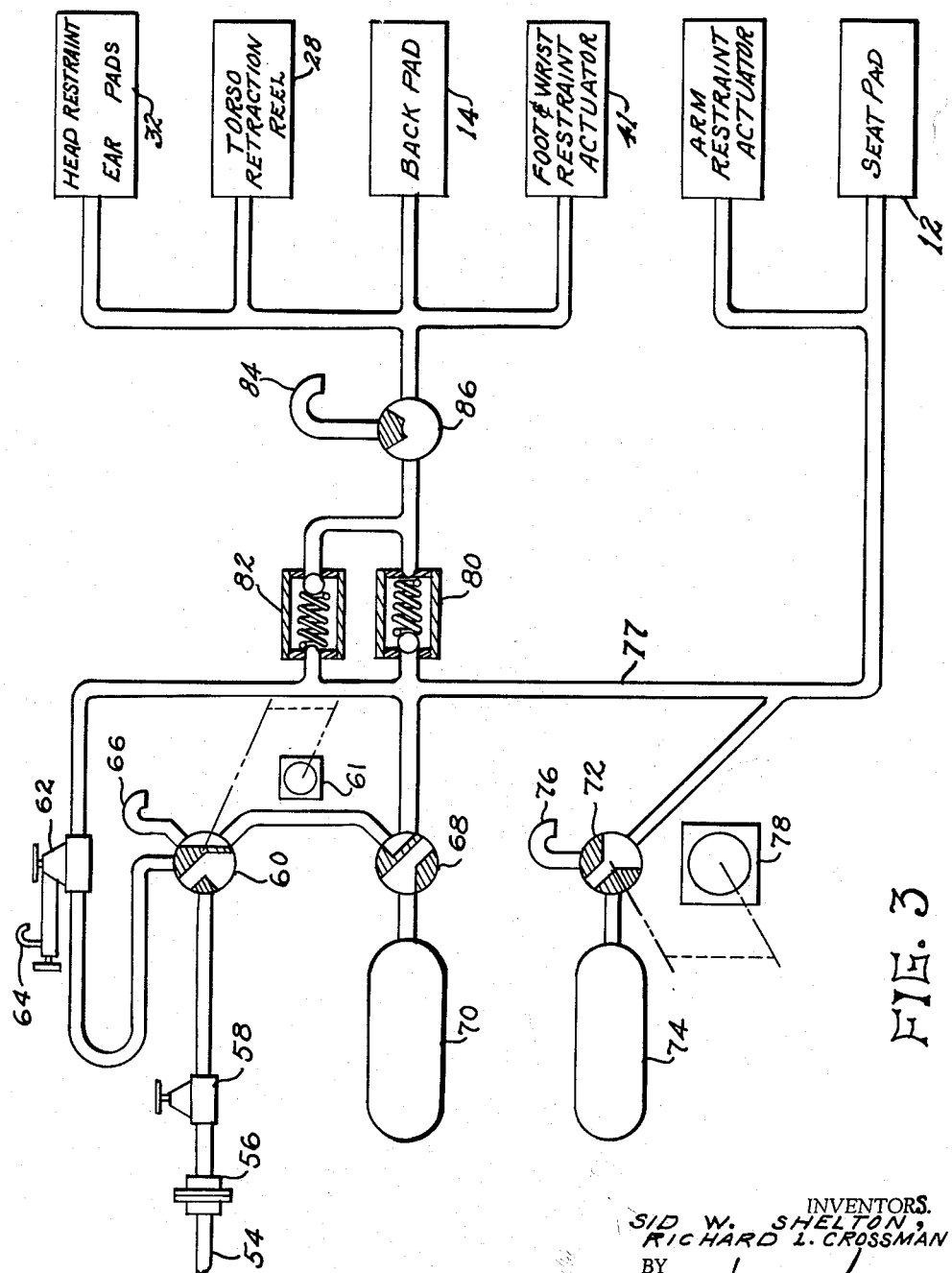
FIGURE 3 is a schematic diagram showing the pressurization system with its controls.

All of the supplementary body support components described above are actuated by air pressure or pneumatic motors or reels. The components of the actuating system are shown in FIGURE 3. A source of air supply from the aircraft system is shown entering at 54. The source that is required for operation of the restraint system provides for an output of 2.36 cubic feet at 60 p.s.i. for one total restraint cycle. The restraint system, however, is capable of operation in the range of from 60 to 3,000 p.s.i. for its supply. Compressed air entering at 54 travels through a conventional quick disconnect coupling 56 which provides for separation of the aircraft air supply upon ejection of the capsule and the remainder of the system. The quick disconnect 56 contains a valve which closes the line against pressure loss from the restraint system upon separation thereof. A pressure regulator is provided at 58 to maintain air from the aircraft supply at a fixed output of 60 p.s.i. and a flow rate of at least 120 cubic feet per minute. The air is then directed to a three position, manual override, inertial valve 60. The inertial operation of the valve comprises a conventional means 61 for sensing acceleration and provides an output for operation of the valve to a position to provide total area restraint when the valve is positioned for either partial area restraint or for normal, vented operation.

Separate supplies are provided for emergency operation and for operation of the restraint system upon ground impact. The compressed air supply bottle 70 provides the emergency supply upon ejection of the astronaut and a disconnection from the source at 54. Bottle 70 contains 50 cubic inches of air at 5,000 p.s.i. and has associated therewith a two position valve 68 which is operated when ejection is initiated. A bottle 74, identical to bottle 70, is provided for ground impact operation. The emergency bottle 74 is connected to a ground impact valve 72 having three positions and being normally in its closed position. This valve is controlled by a ground impact and a vent timing actuator 78 which contains a proximity fuse that supplies the signal and power for actuating the valve 72. A time delay and charge operates the ground impact valve 72 to its vent position at the proper time to release the pressure after ground impact.

A pressure regulator is provided at 62 with a miniature self-bleeding portion with a 10 cubic feet per minute flow rate. The regulator is coupled with an adjustable metering vent at 64 such that the system is capable of operation from 0 to 5 p.s.i. Each of the systems thus far described, the aircraft supply, the ejection supply 70, and the ground impact emergency supply 74 and their associated valves, are arranged for connection to a common pipe line 77 which is connected without any valves to the arm restraint actuator or bladder and the seat pad 12. In addition, the common line connects with the foot restraint actuator comprising a bladder and reel and the back pad, torso retraction reel, and the ear pads 32, through a pair of check valves 80 and 82 and a manual override valve 86 which is a conventional two position valve with a spring loaded plunger for its actuation. The check valves 80 and 82 are conventional, the valve 80 being set for a 6 p.s.i. minimum opening and utilized as a pressure regulator. The check valve 82 set at 1 p.s.i. is utilized to prevent flow reversal.

Vents 66, 76 and 84 are provided for the manual override inertial valve 60, the ground impact valve 72, and the manual override valve 86, respectively. The metering vent 64 associated with pressure regulator 62 is adjustable to provide and maintain a constant bleed-down for the system.

The aforementioned pneumatic system is capable of either manual or automatic control. The automatic control is provided for accelerations over 6 $g$'s. Accelerations less than 6 $g$'s need only utilize the normal restraint provided by the restraint components in their uninflated condition.

The automatic operation depends upon which of the pressure sources is utilized. When the aircraft air supply at 54 is utilized operation is continuous and repetitive. In use the manual override and inertial valve 60 is positioned so that it is vented to the cockpit through vent 66. When an acceleration of 6 $g$'s or more is experienced, the valve is operated to admit pressure to the system. The pressure in the line to pressure regulators 62 builds up from 0 to 60 p.s.i. in approximately one second through valve 60. Thus, the duration of acceleration above 6 $g$'s will affect the pressure in the restraint system. A pressure downstream from valve 62 from 0 to 5 p.s.i. will inflate only the seat pad 12 and actuate the arm restraint bladder thus producing partial restraint. A pressure greater than 6 p.s.i. operates check valve 80 to pressurize the head restraint ear pads 32, cause actuation of the torso retraction reel 28, the foot and wrist restraint elements and to pressurize the back pad 14. Cessation of acceleration allows a reduction of the pressure through valve 82 and the metering vent 64.

When emergency escape is initiated and the system is separated from the aircraft supply, the ejection valve 68 is operated to pressurize the restraint system to 60 p.s.i. from the ejection emergency bottle 70. The high pressure immediately available from bottle 70 accomplishes total area restraint. The bleed-down metering vent 64 starts operation with pressurization.

Upon approaching the ground the system is automatically operated by a conventional proximity fuse in the ground impact and vent timing actuator 78. Ignition of the proximity fuse as the capsule approaches ground causes the restraint system to be pressurized to 60 p.s.i. because of actuation of the ground impact valve 72.

Manual control restraint is accomplished by operating the manual override inertial valve 60 to one position where the restraint system is pressurized through regulator 62 to provide partial area restraint and, in its second position, to pressurize the restraint system to 60 p.s.i. When the pressure exceeds 6 p.s.i., total area restraint is provided.

Release of the restraint system is provided by operation of the manual override valve 86 to vent and reduce the pressure in the system to below 6 p.s.i. Manual override inertial valve 60 and the ground impact valve 72 are operated to dump completely the pressure in the system. In addition, the quick disconnect releases provided with the torso vest and with the leg curtains may be interconnected such that release of one may be made to effectuate the release of all.

Thus, with partial area restraint the leg curtain is tightened by the seat pad 12. In addition, arm restraint is achieved by inflation of the bladder within arm net 36. Since the torso vest is not tightened pneumatically during partial restraint, some degree of restraint is provided by the initial adjustments of the vest made when the astronaut is placed in the seat. Partial area restraint may be used during normal flight, rough weather, or weightlessness conditions or accelerations from 0 to 6 g's.

When total area restraint is desired, all components of the restraint system are pressurized, thereby causing a tightening of the torso vest by inflation of the back pad and a tightening of the head net with inflation of the ear pads which may be pneumatically connected to the back pad. Inflation of bladder 41 lifts the upper legs, retracts the feet, tightens the leg curtains and retracts the hands to the upper leg. The partial area restraint system is also operated during total area restraint.

It should be clear from the foregoing description that this invention provides a restraint system allowing freedom of movement during normal conditions, automatic positioning and complete immobility of the occupant during maximum acceleration conditions and that it provides the widest possible bodily distribution of accelerative forces and provides positive restraint support of the upper torso during maximum acceleration. The restraint system further provides ease of egress and ingress of the occupant from the escape device or flight vehicle. Furthermore, the system reinforces the skin pressure by varying the air pressure in the air pads to provide comfort and protection in the weightless state and it further provides vibration protection by varying the air pressure in the air pads.

Although the invention has been described with reference to a particular embodiment, it will be understood to those skilled in the art that the invention is capable of a variety of alternative embodiments within the spirit and scope of the appended claims.

What is claimed is:

1. In an inflatable personnel restraint system for advanced flight vehicles the combination of a seat and a back rest, each fastened to said vehicle, a plastic foam filled pad on said seat, a second plastic foam filled pad forming a back support and in contact with said back rest, both of said pads being capable of inflation, a torso vest having edges thereof secured to said second pad, a pneumatically operated torso retraction reel on said back rest, cable means from said reel to said vest, a pair of inflatable ear pads secured to said second pad, a head net secured to said back pad and said ear pads, an arm net connected from the portion of said back pad at which an astronaut's shoulder and upper arm would be located and extending to a position proximate to the center of the forward edge of said seat, an inflatable bladder adjacent the upper arm portion of said back pad, leg curtains extending from said vest to cover the shins of an astronaut, a pair of stirrups capable of attachment to the shoe of an astronaut, cabling means from said leg curtain extending through said stirrups to said seat, cable means capable of attachment to the wrists of an astronaut, an inflatable foot and wrist restraint bladder on said seat pad positioned at the portion of said seat pad at which an astronaut's thigh would be located, and a system for supplying air pressure for inflating said bladders and said pads and for operating said retraction reel.

2. In a system as defined in claim 1 wherein said system for supplying air pressure comprises a continuous supply of air from said flight vehicle.

3. In a system as defined in claim 1 wherein said system for supplying air pressure comprises an emergency supply bottle for supplying air pressure when said restraint system is separated from its vehicle.

4. In a system as defined in claim 1 wherein said system for supplying air pressure comprises a ground impact emergency supply of pressurized air operable upon a predetermined proximity to the earth.

5. In a system as defined in claim 1 wherein said system for supplying air pressure comprises a supply from said vehicle for providing continuous pressure, an emergency supply bottle for supplying air pressure when said restraint system is separated from its vehicle, and a ground impact emergency supply of pressurized air operable upon a predetermined proximity to the earth.

6. In a restraint system as defined in claim 1 the combination wherein said bladder within said arm net at the upper arm portion of said back pad and said seat pad are separately operable from the pneumatic operation of said ear pads, back pad, torso retraction reel and foot and wrist restraint bladder.

7. The combination of claim 1 including manually operated means for controlling air pressure to said bladders, pads and torso reel.

8. The combination as defined in claim 1 including automatically controlled means for controlling the air pressure to said bladders, pads, and torso reel.

9. The combination as defined in claim 1 including means automatically controlled by a predetermined acceleration for controlling the air pressure to said bladders, pads, and torso reel.

References Cited by the Examiner

UNITED STATES PATENTS

| | | | |
|---|---|---|---|
| 2,057,687 | 10/36 | Manson | 244—122 |
| 2,638,293 | 5/53 | Lindstrom | 244—122 |
| 2,813,690 | 11/57 | Holmes | 244—122 |
| 2,940,443 | 6/60 | Baker. | |
| 3,074,669 | 1/63 | Bohlin | 244—122 |
| 3,099,261 | 7/63 | Doss et al. | |

FOREIGN PATENTS 163,592    5/21    Great Britain.

FERGUS S. MIDDLETON, *Primary Examiner.*